(12) United States Patent
Oaku et al.

(10) Patent No.: US 6,660,387 B2
(45) Date of Patent: Dec. 9, 2003

(54) DISPLAY DEVICE SUBSTRATE AND DISPLAY DEVICE FORMED THEREWITH

(75) Inventors: Hitoshi Oaku, Tokyo (JP); Yasuo Hanawa, Hitachinaka (JP); Shigeo Amagi, Tokai-mura (JP); Tomoji Oishi, Hitachi (JP); Katsumi Kondou, Mito (JP)

(73) Assignee: Hitachi, Ltd., Tokyo (JP)

( * ) Notice: Subject to any disclaimer, the term of this patent is extended or adjusted under 35 U.S.C. 154(b) by 34 days.

(21) Appl. No.: 10/101,167

(22) Filed: Mar. 20, 2002

(65) Prior Publication Data

US 2003/0077453 A1 Apr. 24, 2003

(30) Foreign Application Priority Data

Oct. 18, 2001 (JP) ........................................ 2001-320062

(51) Int. Cl.$^7$ ................................................ B32B 17/10
(52) U.S. Cl. ........................ 428/415; 428/413; 428/414; 428/426; 428/427; 428/428; 428/447; 428/443; 523/27
(58) Field of Search .................................. 428/413–415, 428/426, 427, 428, 447, 448; 528/27

(56) References Cited

U.S. PATENT DOCUMENTS 6,172,457 B1 * 1/2001 Brown et al. ............... 313/496

FOREIGN PATENT DOCUMENTS

JP          57196747 A   * 12/1982   .......... C03C/27/12

* cited by examiner

*Primary Examiner*—Robert Dawson
*Assistant Examiner*—Marc S Zimmer
(74) *Attorney, Agent, or Firm*—Antonelli, Terry, Stout & Kraus, LLP

(57) ABSTRACT

A display device substrate which meets requirements for weight reduction, thickness reduction, high reliability, good heat resistance, and good impact resistance all at once. The display device substrate is composed of a pair of glass sheets facing each other and a layer of plastics material interposed between said paired glass sheets in such a way that said glass sheets have an internal compressive strain ascribed to the plastic sheet. Thus, the very thin glass sheets are hardly liable to breakage. This makes light weight and reduced thickness compatible with reliability.

47 Claims, 5 Drawing Sheets

[UNBONDED MATERIALS FOR FREE EXPANSION AND CONTRACTION]

[BONDED MATERIALS IN UNIFIED FORM]

FIG.7
RESULTS OF BALL DROP TEST ON SUBSTRATES FOR DISPLAY DEVICE

| | TOTAL THICKNESS OF SUBSTRATE | GLASS THICKNESS | DROP HEIGHT | | | | |
|---|---|---|---|---|---|---|---|
| | | | 10cm | 15cm | 20cm | 25cm | 30cm |
| GLASS SUBSTRATE (AS REFERENCE) | 50 μm | ↓ | X | | | | |
| | 100 μm | ↓ | X | | | | |
| | 200 μm | ↓ | X | | | | |
| | 300 μm | ↓ | O | X | | | |
| | 500 μm | ↓ | O | O | △ | | |
| SAMPLE SUBSTRATE | 190 μm | 50 μm | O | O | △ | | △ |
| | 280 μm | 70 μm | O | O | O | | △ |
| | 300 μm | 100 μm | O | O | O | X | |
| | 820 μm | 200 μm | O | O | O | | △ |

O = NO CRACKING OCCURRED
X = CRACKING OCCURRED
△ = VERY SLIGHT CRACKING OCCURRED AT THE BALL DROP POINT

DISPLAY DEVICE SUBSTRATE AND DISPLAY DEVICE FORMED THEREWITH

BACKGROUND OF THE INVENTION

The present invention relates to a display device substrate to be used in the production of panels for display devices, particularly liquid crystal display devices and organic EL devices. More particularly, the present invention relates to a display device substrate which is lighter in weight and less liable to break than the conventional one.

The recent rapid development in computer networks and digital communications has involved an even larger number of personal users in the advanced information society having information networks as one of its bases, and it has created the need for diversification and sophistication, of networks and components thereof.

As a result, conventional desktop personal computers are required to have not only an improved information processing capability (including an improved data display performance), but also a new ability to access networks freely and easily through a portable telephone or portable information terminal. Such portable information equipment is expected to function as a platform that provides various applications in which image information is involved in addition to its original functions.

Improvements required of portable information equipment (or terminals) in its fundamental performance include faster transmission speeds for networking, a larger data processing capacity, a better display visibility, lighter weight, and easier handleability and transportability.

Such requirements are applicable also to the flat panel display (such as liquid crystal display device and organic EL device), which is major component of portable information equipment. Improvements sought are reduction in weight and thickness and high-density display (or high definition display).

Attempts have been made to meet such sophisticated and diversified requirements. For example, in the case of a liquid crystal display (LCD), one way to meet requirements for reduction in weight and thickness is to manufacture the LCD panel from a thinner substrate than before. Glass substrates are commonly used in the LCD technology. Therefore, the above-mentioned requirements will be met to some extent by manufacturing the LCD panel from thin glass substrates. Unfortunately, glass suffers the disadvantage of being broken easily by impact due to dropping or external pressure. Therefore, further reduction in thickness would be difficult to achieve from the standpoint of an LCD's impact resistance and breakage prevention.

Glass sheets now available for LCD panels have a thickness of 1.1 mm, 0.7 mm, 0.5 mm, or 0.4 mm (with 0.7 mm being common) according to "Liquid Crystal Device Handbook" (Chapter 4, Section 4.2, page 218, compiled by Japan Society for the Promotion of Science, issued in 1989 by Nikkan Kogyo Shimbunsha). A glass sheet with a thickness of 0.4 mm is difficult to handle in the LCD manufacturing process because of its liability for chipping and breakage, which leads to reduced yields. At present, reduction to about 0.3 mm is considered to be the maximum that can be achieved for display device glass substrates.

Another way under study for improvement in the technical field of an LCD is replacement of glass sheets by plastics sheets, as disclosed in Japanese Patent Laid-open No. 6-175143. Plastics sheets can be made thinner than glass sheets on account of their flexibility (hence providing good crack resistance) and high resistance to dropping impact and external pressure. Plastics sheets have a specific gravity of 1.2–1.4, whereas glass sheets have a specific gravity of 2.3. Therefore, an LCD with a substrate made of a plastic sheet is lighter and thinner than that with a substrate made of a glass sheet.

Unfortunately, plastics sheets usually have a lower transmission for visible light and a higher rate of gas permeability than glass sheets. The latter property poses a problem with foaming in liquid crystal inside the panel.

Plastics sheets with good gas barrier properties should necessarily be thick, and this means that such plastics sheets have a poor light transmission, giving rise to a dark display. Therefore, the resulting LCD based on use of a plastics sheet is inferior in visibility to the conventional LCD based on use of a glass sheet.

In addition, plastics sheets are inferior in heat resistance to glass sheets. At high temperatures, they are subject to discoloration (decrease in light transmission) and deformation (such as bending and warpage). Therefore, production of an LCD with a plastics sheet should be carried out at low temperatures. This makes it necessary to develop new materials usable at low temperatures, such as the sealing agent to bond together paired substrates, with a liquid crystal interposed between them, and an alignment film to align the liquid crystal.

Moreover, a plastics sheet suffers another disadvantage in that it is difficult to form an electrode film thereon from low-resistance ITO (indium-tin oxide) at high temperatures. ITO varies in resistance or conductivity depending on its film-forming temperature. Thus, the disadvantage of an LCD based on use of a plastics sheet is that finely patterned ITO electrodes have a high resistance, which is detrimental to a high definition display.

The conventional plastics sheet does not withstand heat encountered in the process of producing TFTs (thin film transistors) necessary for a high-quality LCD of the active matrix drive type. Thus, it is difficult to form TFTs on a plastics sheet, and hence it is difficult to realize a high-quality display by means of an active matrix drive so long as the LCD is formed with a substrate made of a plastics sheet.

Thus, an LCD formed with a plastics sheet is not comparable to that formed with a glass sheet in producing a high definition display. Thus, it will not be able to display moving pictures.

A third improvement in the technical field of the LCD is to form the display device from a laminate substrate consisting of a pair of glass sheets and a plastics sheet held between them, as disclosed in Japanese Patent Laid-open Nos. 7-43696, 7-49486, and 7-287218. A conventional three-layered laminate substrate used for LCD panels is shown in section in FIG. 1. It consists of a pair of glass sheets 101 and 102 and a soft plastics sheet 103 held between them.

The advantage of the laminate substrate is that the plastics sheet has improved heat resistance owing to the presence of the outer glass sheets. On the other hand, the plastics sheet is usually made of polyvinyl butyral (which is comparatively soft), as disclosed in Japanese Patent Laid-open No. 7-43696, so that the plastics sheet produces no stress in the glass sheets laminated onto both sides thereof.

If an extremely thin plastics sheet (100 $\mu$m or so) is used to reduce the total thickness of the substrate, it produces the effect of preventing the glass sheet from shattering when the substrate is broken, but it will not produce the effect of improving impact resistance or preventing the glass sheet from being broken.

It is understood from the foregoing that the conventional technology still has problems to be solved and that there is room for improvement before it is applied to the current flat panel display (LCD and organic EL device).

In order to realize a flat panel display (LCD and organic EL device) with improved performance (including light weight, small thickness, and high definition display), which will be necessary for moving pictures in the future, it is necessary to develop a new technology which fully utilizes the features of a glass sheet and a plastics sheet, but eliminates their disadvantages.

More specifically, the flat panel display according to the new technology should have high heat resistance (ascribed to glass) and light weight and small thickness (ascribed to plastics) and better impact resistance than glass.

SUMMARY OF THE INVENTION

It is an object of the present invention to provide a new display device substrate which meets the requirements for reduction in weight and thickness and improvement in gas barrier properties, heat resistance, and impact resistance.

It is another object of the present invention to provide a new display device substrate having a laminate structure consisting of glass sheets and a plastics sheet, such that the glass sheets are more resistant to breaking than before or are equivalent to a 0.3 mm thick glass sheet in impact resistance.

It is another object of the present invention to provide a display device, such as LCD and organic EL device, which is light in weight and small in thickness and is superior in impact resistance and display quality.

The present invention is directed to an improved display device substrate which is composed of a pair of glass sheets facing each other and a layer of plastics material interposed between the glass sheets, wherein the improvement comprises glass sheets having an internal compressive strain.

According to an embodiment of the present invention, the glass sheets have an internal compressive strain ascribed to the layer of plastics material interposed between them.

According to an embodiment of the present invention, the layer of plastics material is that of a thermosetting resin excluding polyurethane.

According to an embodiment of the present invention, the layer of plastics material is that of epoxy resin.

According to an embodiment of the present invention, the layer of plastics material is that of inorganic-organic hybrid material.

According to an embodiment of the present invention, the layer of plastics material is that of epoxy-silicone-based inorganic-organic hybrid material.

According to an embodiment of the present invention, the layer of plastics material is that of epoxy-silicone-based inorganic-organic hybrid material synthesized from an epoxy resin and an organosilicon compound.

According to an embodiment of the present invention, the layer of plastics material is that of inorganic-organic hybrid material synthesized from an epoxy-type organosilicon alkoxide represented by the chemical formula (1) below.

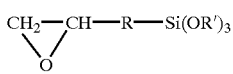

(where R and R' each denote an organic group.)

According to an embodiment of the present invention, the layer of plastics material is that of inorganic-organic hybrid material synthesized from any of epoxy resin of glycidyl ether type composed mainly of a phenolic compound, such as bisphenol-A, bisphenol-F, tetrabromobisphenol-A, tetraphenylolethane, phenol-novolak, and o-cresol-novolak; epoxy resin of glycidyl ether type composed mainly of an alcoholic compound such as polypropylene glycol and hydrogenated bisphenol-A; epoxy resin of glycidyl ester type composed mainly of hexahydrophthalic anhydride or dimmer acid; epoxy resin of glycidyl amine type composed mainly of diaminophenylmethane, isocyanuric acid, or hydantoin; epoxy resin of mixed type composed mainly of p-aminophenol or p-oxybenzoic acid; and epoxy resin composed mainly of an ester represented by the chemical formula (2) below.

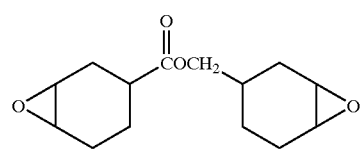

According to an embodiment of the present invention, the layer of plastics material contains a silicon component (in terms of $SiO_2$) in an amount more than 0 wt % and less than 30 wt %.

According to an embodiment of the present invention, the layer of plastics material contains a silicon component (in terms of $SiO_2$) in an amount more than 4 wt % and less than 15 wt %.

According to an embodiment of the present invention, the glass sheets have an internal compressive strain no less than $1.9 \times 10^{-4}$.

According to an embodiment of the present invention, the display device substrate has a thickness no larger than 0.3 mm.

According to an embodiment of the present invention, the display device substrate satisfies the relation represented by the mathematical expression (1) below.

$$|\{(\alpha g - \alpha r) \times \Delta T \times (Er \times hr)\}/\{(Er \times hr)+(Eg \times hg)\}| \geq 1.9 \times 10^{-4} \quad (1)$$

(where ΔT denotes a difference between the operating temperature of the display device substrate and the glass transition point (Tg) of the plastics material or the maximum temperature to be reached by the plastics material during its curing or molding if the latter is lower than the former.)

αg=coefficient of linear expansion of glass used
αr=coefficient of linear expansion of plastics material
Eg=elastic modulus of glass
Er=elastic modulus of plastics material
hg=total thickness of glass sheets
hr=thickness of plastics material According to an embodiment of the present invention, the display device substrate satisfies the relation represented by the mathematical expression (2) below.

$$\{\alpha r \times \Delta T \times (Er \times hr)\}/\{Eg \times hg\} \geq 1.9 \times 10^{-4} \quad (2)$$

According to an embodiment of the present invention, the display device substrate satisfies the mathematical expression (2) and the glass sheets have a total thickness no smaller than 60 µm.

According to an embodiment of the present invention, the display device substrate satisfies the mathematical expression (2) and the glass sheets have a total thickness no smaller than 100 µm.

According to an embodiment of the present invention, the display device substrate satisfies the mathematical expression (2) and the glass sheets have a total thickness no smaller than 140 µm.

According to an embodiment of the present invention, the display device substrate satisfies the mathematical expression (3).

$$\{\alpha r \times \Delta T \times (Er \times hr)\} \geq 2800 \text{ Pa·m (Pascal-meter)} \quad (3)$$

According to an embodiment of the present invention, the display device substrate satisfies the mathematical expression (4).

$$(\alpha r \times \Delta T \times hr) \geq 1.4 \times 10^{-6} \text{ m} \quad (4)$$

According to an embodiment of the present invention, the display device substrate satisfies the mathematical expression (5) and the glass sheets have a total thickness no smaller than 150 µm.

$$\{\alpha r \times \Delta T \times (Er \times hr)\} 2100 \text{ Pa·m} \quad (5)$$

According to an embodiment of the present invention, the display device substrate satisfies the mathematical expression (6) and the glass sheets have a total thickness no smaller than 100 µm.

$$\{\alpha r \times \Delta T \times (Er \times hr)\} \geq 1400 \text{ Pa·m} \quad (6)$$

According to an embodiment of the present invention, the maximum temperature to be reached by the plastics material during its curing or molding is lower than its glass transition point (Tg) and ΔT is a difference between the operating temperature of the display device substrate and the maximum temperature to be reached by the plastics material during its curing or molding.

According to an embodiment of the present invention, the glass sheets have an internal compressive strain no smaller than $3.4 \times 10^{-4}$.

According to an embodiment of the present invention, the display device substrate has a thickness no larger than 0.3 mm.

According to an embodiment of the present invention, the display device substrate satisfies the relation represented by the mathematical expression (7).

$$|\{(\alpha g - \alpha r) \times \Delta T \times (Er \times hr)\}/\{(Er \times hr) + (Eg \times hg)\}| \geq 3.4 \times 10^{-4} \quad (7)$$

(where ΔT denotes a difference between the operating temperature of the display device substrate and the glass transition point (Tg) of the plastics material or the maximum temperature to be reached by the plastics material during its curing or molding if the latter is lower than the former.)

αg=coefficient of linear expansion of glass used

αr=coefficient of linear expansion of plastics material

Eg=elastic modulus of glass

Er=elastic modulus of plastics material hg=total thickness of glass sheets hr=thickness of plastics material According to an embodiment of the present invention, the display device substrate satisfies the relation represented by the mathematical expression (8).

$$\{\alpha r \times \Delta T \times (Er \times hr)\}/\{Eg \times hg\} \geq 3.4 \times 10^{-4} \quad (8)$$

According to an embodiment of the present invention, the glass sheets have a total thickness no smaller than 100 µm.

According to an embodiment of the present invention, the glass sheets have a total thickness no smaller than 140 µm.

According to an embodiment of the present invention, the display device substrate satisfies the relation represented by the mathematical expression (9) and the glass sheets have a total thickness no larger than 140 µm.

$$\{\alpha r \times \Delta T \times (Er \times hr)\} \geq 3500 \text{ Pa·m} \quad (9)$$

According to an embodiment of the present invention, the display device substrate satisfies the relation represented by the mathematical expression (10) and the glass sheets have a total thickness no larger than 140 µm.

$$(\alpha r \times \Delta T \times hr) \geq 1.7 \times 10^{-6} \text{ m} \quad (10)$$

According to an embodiment of the present invention, the display device substrate satisfies the relation represented by the mathematical expression (11) and the glass sheets have a total thickness no larger than 100 µm.

$$\{\alpha r \times \Delta T \times (Er \times hr)\} \geq 2500 \text{ Pa·m} \quad (b\ 11)$$

According to an embodiment of the present invention, the display device substrate satisfies the relation represented by the mathematical expression (12) and the glass sheets have a total thickness no larger than 100 µm.

$$(\alpha r \times \Delta T \times hr) \geq 1.2 \times 10^{-6} \text{ m} \quad (12)$$

According to an embodiment of the present invention, the maximum temperature to be reached by the plastics material during its curing or molding is lower than its glass transition point (Tg) and ΔT is a difference between the operating temperature of the display device substrate and the maximum temperature to be reached by the plastics material during its curing or molding.

According to an embodiment of the present invention, the display device substrate has a thickness no larger than 0.2 mm and the glass sheets have an internal compressive strain no smaller than $3.4 \times 10^{-4}$.

According to an embodiment of the present invention, the display device substrate satisfies the relation represented by the mathematical expression (13).

$$|\{(\alpha g - \alpha r) \times \Delta T \times (Er \times hr)\}/\{(Er \times hr) + (Eg \times hg)\}| \geq 3.4 \times 10^{-4} \quad (13)$$

(where ΔT denotes a difference between the operating temperature of the display device substrate and the glass transition point (Tg) of the plastics material or the maximum temperature to be reached by the plastics material during its curing or molding if the latter is lower than the former.)

αg=coefficient of linear expansion of glass used
αr=coefficient of linear expansion of plastics material
Eg=elastic modulus of glass
Er=elastic modulus of plastics material
hg=total thickness of glass sheets
hr=thickness of plastics material According to an embodiment of the present invention, the display device substrate satisfies the relation represented by the mathematical expression (14).

$$\{\alpha r \times \Delta T \times (Er \times hr)\}/\{Eg \times hg\} \geq 3.4 \times 10^{-4} \qquad (14)$$

According to an embodiment of the present invention, the glass sheets have a total thickness no smaller than 100 μm.

According to an embodiment of the present invention, the display device substrate satisfies the relation represented by the mathematical expression (15) and the glass sheets have a total thickness no larger than 100 μm.

$$\{\alpha r \times \Delta T \times (Er \times hr)\} \geq 2500 \text{ Pa·m} \qquad (15)$$

According to an embodiment of the present invention, the display device substrate satisfies the relation represented by the mathematical expression (16) and the glass sheets have a total thickness no larger than 100 μm.

$$(\alpha r - \Delta T \times hr) \geq 1.2 \times 10^{-6} \text{ m} \qquad (16)$$

According to an embodiment of the present invention, the maximum temperature to be reached by the plastics material during its curing or molding is lower than its glass transition point (Tg) and ΔT is a difference between the operating temperature of the display device substrate and the maximum temperature to be reached by the plastics material during its curing or molding.

According to an embodiment of the present invention, the glass sheets have an internal compressive strain no smaller than $5.0 \times 10^{-4}$.

According to an embodiment of the present invention, the display device substrate has a thickness no larger than 0.3 mm.

According to an embodiment of the present invention, the display device substrate satisfies the relation represented by the mathematical expression (17).

$$|\{(\alpha g - \alpha r) \times \Delta T \times (Er \times hr)\}/\{(Er \times hr) + (Eg \times hg)\}| \geq 5.0 \times 10^{-4} \qquad (17)$$

(where ΔT denotes a difference between the operating temperature of the display device substrate and the glass transition point (Tg) of the plastics material or the maximum temperature to be reached by the plastics material during its curing or molding if the latter is lower than the former.)

αg=coefficient of linear expansion of glass used
αr=coefficient of linear expansion of plastics material
Eg=elastic modulus of glass
Er=elastic modulus of plastics material
hg=total thickness of glass sheets
hr=thickness of plastics material According to an embodiment of the present invention, the glass sheets have a total thickness no smaller than 100 μm.

According to an embodiment of the present invention, the glass sheets have a total thickness no smaller than 140 μm.

The present invention is directed also to a display device which is formed with at least one piece of the display device substrate defined above.

BRIEF DESCRIPTION OF THE DRAWINGS

FIG. 7 is a table showing the results of the ball drop test applied to the display device substrate in the embodiment of the present invention;

DESCRIPTION OF THE PREFERRED EMBODIMENTS

Embodiments of the present invention will be described with reference to the accompanying drawings.

Figure 1:
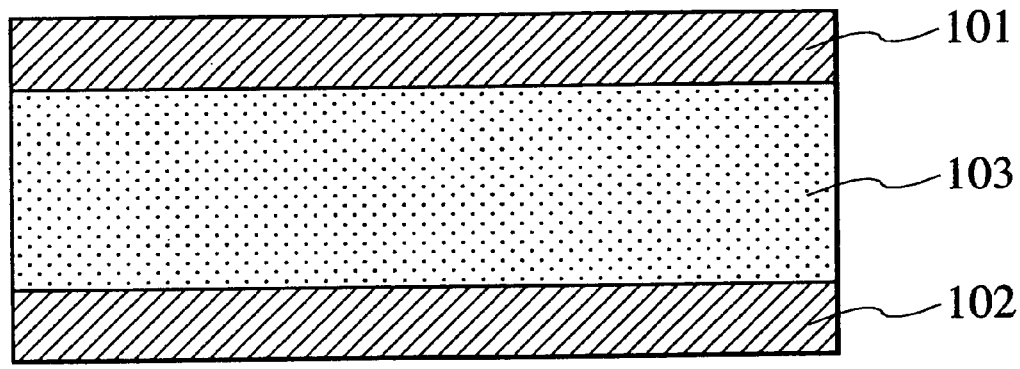
FIG. 1 is a sectional view showing the structure of a conventional three-layered laminate consisting of two glass sheets and a plastics sheet, which is proposed for the production of an LCD panel.
Figure 2:
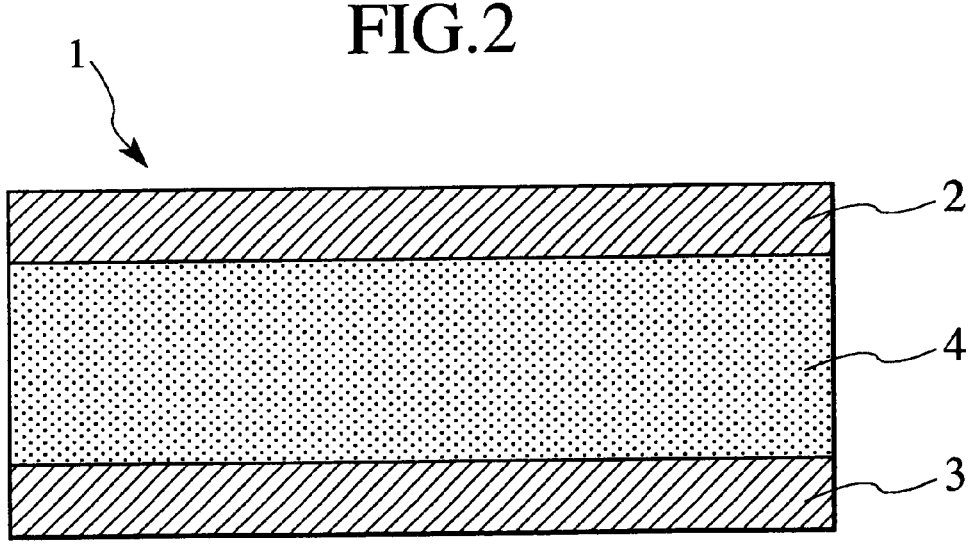
FIG. 2 is a sectional view showing the structure of the display device substrate representing a first embodiment of the present invention.

FIG. 2 is a sectional view showing the structure of a display device substrate according to a first embodiment of the present invention.

According to an embodiment of the present invention, the display device substrate 1 shown in FIG. 2 consists of a pair of glass sheets 2 and 3 facing each other and a layer 4 of plastics material held between the glass sheets 2 and 3. It is constructed such that the glass sheets 2 and 3 have an internal compressive strain. The internal compressive strain in the glass sheets 2 and 3 is imparted by the layer 4 of plastics material held between the glass sheets 2 and 3.

A glass sheet is broken by an impact which produces an internal strain large enough to cause cracking. Glass breakage results from stress by tensile strain more readily than stress by compressive strain. In other words, breakage by impact is ascribed mainly to tensile strain.

The foregoing suggests that a glass sheet will not break easily if it has previously. been subject to an internal compressive strain which would alleviate any tensile strain produced by impact.

The mechanism for improving the impact resistance of a glass sheet will be described with reference to FIG. 3, which illustrates how a glass sheet undergoes free expansion and contraction along with temperature change.

Figure 3:
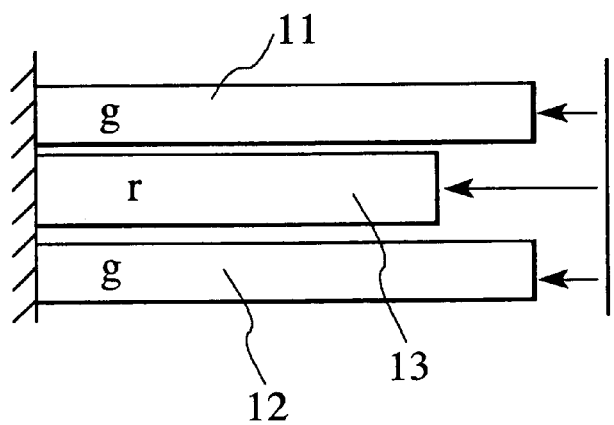
FIG. 3 is a diagram illustrating that the glass sheets and the plastics sheet undergo free expansion and contraction in response to a temperature change.

FIG. 3 shows a pair of glass sheets 11 and 12 with a plastics sheet 13 held between them. In the absence of mutual action between layers, each layer freely expands or contracts as the temperature changes. Usually, a plastics sheet contracts more than a glass sheet because the former has a larger coefficient of linear expansion than the latter. Contraction due to temperature change ($\Delta T$) from high to low causes a strain ($\Delta \epsilon$) which is represented by the mathematical expression (18).

$$\Delta \epsilon = (\alpha g - \alpha r) \times \Delta T \quad (18)$$

(where $\alpha g$ denotes a coefficient of linear expansion of glass and $\alpha r$ denotes a coefficient of linear expansion of plastics.)

In the case of ordinary plastics materials, the temperature change ($\Delta T$) occurs within a range between the glass transition point (Tg) and the temperature at which the product is used or evaluated. This is because, beyond the glass transition point, the coefficient of linear expansion becomes three to four times as large as that at a normal temperature, whereas the longitudinal modulus of elasticity decreases below 1/100. In other words, stress due to strain resulting from a temperature change above Tg is too small to cause any problem.

In the case where the upper limit of the temperature change is lower than Tg, $\Delta T$ is the difference between the upper limit (the maximum temperature to be reached by the plastics material during its curing or molding or by the substrate during its production) and the product temperature.

The state of affairs is different from the foregoing if the glass sheets and the plastics sheet are bonded together. In such a case, strain occurs in each member, as shown in FIG. 4, as the temperature changes from high to low.

Figure 4:
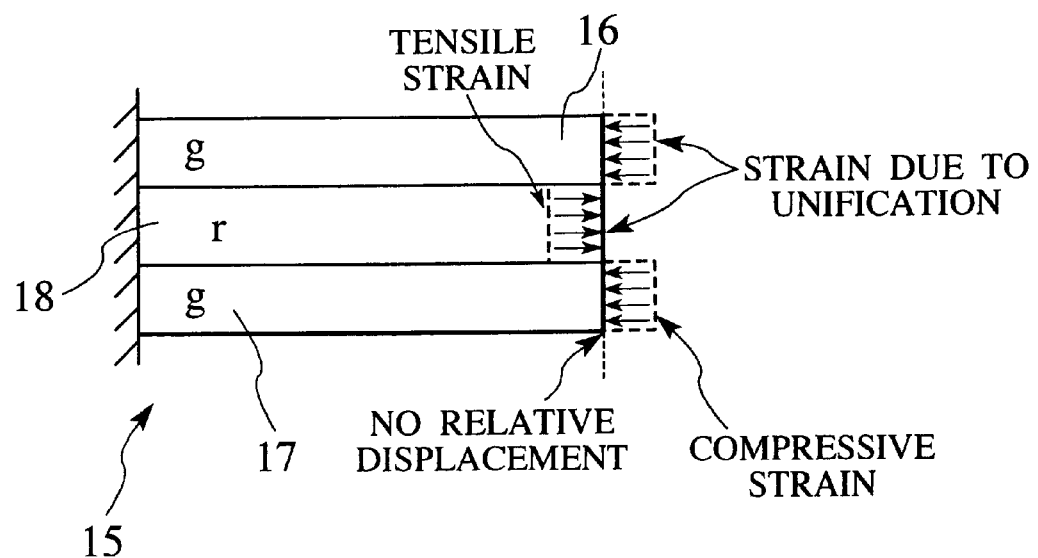
FIG. 4 is a diagram illustrating that the glass sheets and plastics sheet bonded together are subject to strain which occurs in response to a temperature change ΔT.

FIG. 4, shows an integral laminate 15 consisting of glass sheets 16 and 17 and a plastics sheet 18, which are bonded together. Accordingly, as the temperature decreases, the plastics sheet 18 contracts more than the glass sheets 16 and 17. As a result, a compressive strain induced by the plastics sheet 18 occurs in the glass sheets 16 and 17, and a tensile strain induced by the glass sheets 16 and 17 occurs in the plastics sheet 18.

The strain ($\epsilon g$) in the glass sheets 16 and 17 and the strain ($\epsilon r$) in the plastics sheet 18 are related to the tensile rigidity of each material, as represented by the mathematical expression (19).

$$\epsilon g / \epsilon r = (Er \times hr) / (Eg \times hg) \quad (19)$$

(where Eg denotes the longitudinal elastic modulus of glass, Er denotes the longitudinal elastic modulus of the plastics material, hg denotes the total thickness of the two glass sheets, and hr denotes the thickness of the plastics material.) Thus, the strains ($\epsilon g$, $\epsilon r$) that occur in the case where all the layers are bonded together are represented by the following mathematical expressions (20) and (21).

$$\epsilon g = \{(\alpha g - \alpha r) \times \Delta T \times (Er \times hr)\} / \{(Er \times hr) + (Eg \times hg)\} \quad (20)$$

$$\epsilon r = -\{(\alpha g - \alpha r) \times \Delta T \times (Eg \times hg)\} / \{(Er \times hr) + (Eg \times hg)\} \quad (21)$$

Therefore, in the case where all the layers are bonded together, the glass sheets 16 and 17 and the plastics sheet 18 experience the stress ($\sigma g$) and the stress ($\sigma r$), respectively, which are represented by the following mathematical expressions (22) and (23).

$$\sigma g = \epsilon g \times Eg \quad (22)$$

$$\sigma r = \epsilon r \times Eg \quad (23)$$

Figure 5:
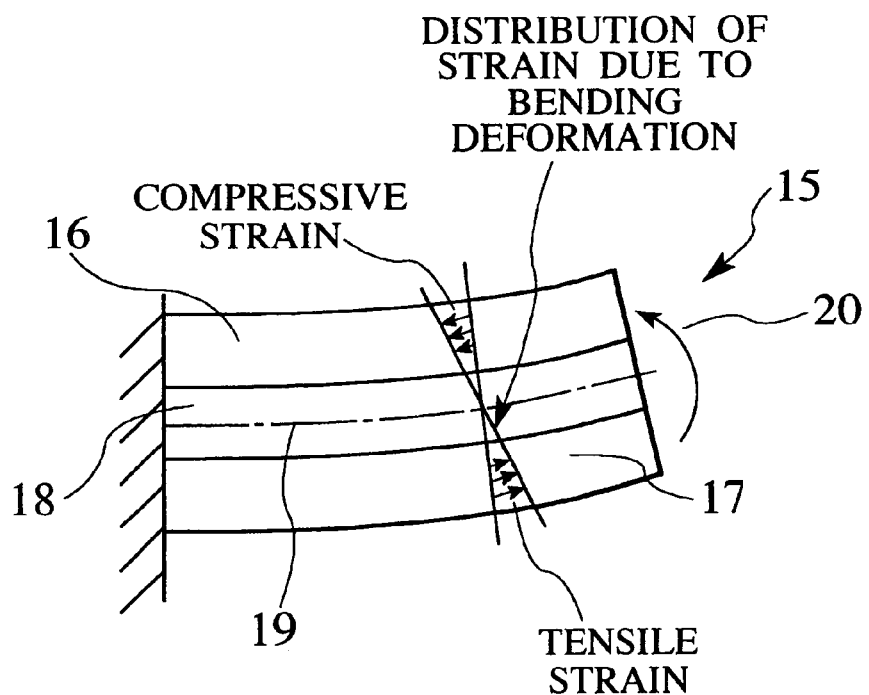
FIG. 5 is a diagram illustrating how strain occurs due to flexural deformation with respect to the neutral axis of the entire laminate.

The laminate under flexure with respect to the neutral axis experiences a strain, as shown in FIG. 5. It is assumed that the laminate 15 is bent with a radius of curvature of R. The bending moment is indicated by the arrow 20. A stress $\sigma H$ represented by the following mathematical expression occurs at a position (H) located away from the neutral axis 19 of the laminate 15.

$$\sigma H = E \times H / R \quad (24)$$

(where E denotes the longitudinal modulus of elasticity of the laminate-constituent member at a position (H) located away from the neutral axis 19.)

If the stress $\epsilon H$ is equal to or larger than the stress $\sigma b$ necessary to break glass, as represented by the following mathematical expression, then glass without a lamination breaks.

$$\epsilon b \leq \sigma H \quad (25)$$

Glass in the laminate 15 breaks under the condition defined by the mathematical expression (26) if it has an internal compressive stress $\sigma g$ induced by the plastics material bonded thereto.

$$\sigma b \leq H + \sigma g \quad (26)$$

In other words, the glass sheet 17 in the laminate 15 becomes less liable to break in proportion to the internal compressive stress $\sigma g$ present therein.

Incidentally, $\sigma b$ is a value common to all glass materials and is independent of the shape (particularly thickness) of the glass materials. A thin glass sheet has a high resistance to flexure, but is liable to break. This is because glass becomes more flexible in inverse proportion to the third power of its thickness, but a thin glass sheet is broken by impact because impact produces a large local deformation exceeding the flexibility.

The glass sheet (usually 0.7 mm thick) used as the display device substrate is required to be as thin as possible from the standpoint of weight reduction. Thickness reduction is also necessary to reduce the parallax which is inevitable in a display device of the reflection type composed of a pair of substrates and a liquid crystal or an organic EL material held between them and a reflector placed behind one of the substrates.

If a display device of the reflection type is made with glass sheets thinner than 0.3 mm in place of the conventional 0.7 mm thick ones, it is possible to appreciably reduce parallax to a permissible level.

The problem with parallax is substantially solved if the display device substrate is thinner than 0.2 mm. Thus, by employing a display device substrate thinner than 0.3 mm (preferably thinner than 0.2 mm), it would be possible to provide a new display device of reflection type which is by far superior in display quality compared to the conventional one.

A display device substrate meeting the foregoing requirements needs to be as light and strong as a 0.3 mm thick glass sheet. The thickness 0.3 mm is regarded as the minimum thickness that can be achieved so far. In order to achieve this object, it is necessary to produce a laminate composed of a pair of glass sheets and a plastics layer held between them in such a way that the plastics layer imparts an adequate compressive strain ($\epsilon g$) to the glass sheets.

The effect of compressive strain should be larger than the effect of easy bending produced by replacing high-modulus glass by low-modulus plastics material.

The foregoing discussion suggests that the display device substrate consisting of a pair of glass sheets and a plastic sheet held between them is improved in impact resistance if the constituent materials are selected such that a large compressive strain is imparted to the paired glass sheets holding a plastics sheet between them.

The light weight and small thickness required of the display device substrate will be realized simultaneously only by employing an extremely thin glass sheet and imparting an optimum internal compressive strain to the glass sheet. An extremely thin glass sheet is desirable for thickness reduction but is liable to break. An internal compressive strain is necessary for the glass sheet to have sufficient impact resistance.

In order to achieve the foregoing object, it is necessary to comprehensively consider the total thickness of the display device substrate, the thickness of the glass sheet, the thickness of the plastics sheet, and the characteristic properties (such as Tg, coefficient of linear expansion, and modulus of elasticity) of the plastics material.

To illustrate the embodiment of the present invention, a variety of display device substrates of three-layered structure were prepared. Each display device substrate consisted of a pair of glass sheets facing each other and a plastics sheet held between them. The samples varied in the total thickness of the substrate, the thickness of the glass sheet, and the thickness of the plastics sheet.

Evaluation of the samples revealed the conditions (such as the total thickness, the thickness of glass sheet, and the thickness of plastics sheet) necessary for the display device substrate to meet requirements for light weight and small thickness, as well as better impact resistance, than the conventional 0.3 mm thick or 0.5 mm thick glass sheet.

The samples were also used to examine how large the internal compressive strain (stress) should be in the glass sheet if the display device substrate of the laminate type is to meet the requirements for light weight and small thickness, as well as good impact resistance.

The plastic sheet held between the paired glass sheets was formed from an inorganic-organic hybrid material based on an epoxy resin. Details of its method of manufacture and condition are given in the section of examples mentioned later.

The inorganic-organic hybrid material based on an epoxy resin is a hard thermosetting material, as will be explained later. In its uncured state, the hybrid material is molded and then set between a pair of glass sheets. On cooling, it imparts a large stress to the glass sheets on account of its high modulus and its large coefficient of linear expansion.

Being a thermosetting material, the hybrid material continues to impart an internal stress even though it is heated again after curing. Therefore, the display device substrate retains its high impact resistance.

In other words, the plastics sheet held between the paired glass sheets should preferably be formed from a thermosetting material. However, polyurethane should be excluded, although it is thermosetting, because it is too soft to impart compressive stress.

In addition, a variety of display device substrates were prepared which differ in the thickness of the glass sheet, the thickness of the plastics sheet, and the total thickness of the substrate. They were examined to elucidate the relation between the internal stress (strain) in the glass sheet and the impact resistance.

Figure 6:
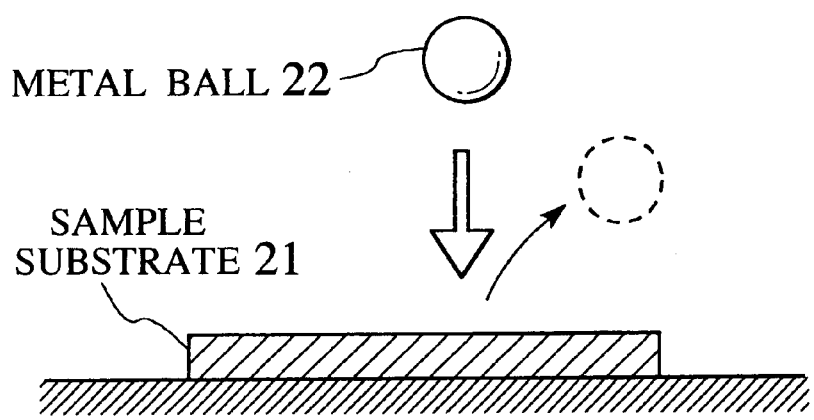
FIG. 6 is a diagram illustrating a ball drop test applied to the display device substrate in the embodiment of the present invention.

The samples of display device substrates were examined for impact resistance using the ball drop test shown in FIG. 6.

The ball drop test consists of dropping a metal ball 22 onto a sample substrate 21 that is kept in a standstill condition and observing whether cracking occurs in the sample. Details of the test, including the method for preparing the substrate, will be given later in the section of examples.

The results of the ball drop test performed on the display device substrate in the embodiment of the present invention are tabulated in FIG. 7. In the table are also shown the results of tests on the reference samples which are formed from a glass sheet alone. The total thickness of the substrate is twice the thickness of the glass sheet plus the thickness of the plastics sheet. In other words, the thickness of the plastics sheet is obtained by subtracting the total thickness of the glass sheets from the total thickness of the substrate.

It is noted from the table in FIG. 7 that the glass sheets whose thickness is 0.2 mm thick or less are poor in impact resistance or the substrates formed from them are broken by the metal ball falling from a height of 10 cm. The glass sheet which is 0.3 mm thick withstands the metal ball falling from a height of 10 cm, but it is broken by the metal ball falling from a height of 15 cm. The glass sheet which is 0.5 mm thick is not broken, but is scratched, by the metal ball falling from a height of 20 cm, and it is broken by the metal ball falling from a height of 25 cm.

According to the embodiment of the present invention, the display device substrate 1 (shown in FIG. 2) is composed of two glass sheets 2 and 3 (each 100 $\mu$m thick) and one layer 4 of hybrid material (100 $\mu$m thick), with the total thickness being 300 $\mu$m. This structure is represented by glass/HB/glass=100/100/100 hereinafter, where HB stands for hybrid material. This display device substrate proved to be comparable in impact resistance to the one formed from a single glass sheet 0.3 mm thick.

In other words, the display device substrate, which is composed of thin glass sheets according to the present invention, is comparable in impact resistance to the one formed from a thicker glass sheet owing to the thermosetting hybrid material (100 $\mu$m thick) which imparts an internal stress to the two glass sheets (200 $\mu$m thick).

As shown in the table in FIG. 7, the display device substrate (glass/HB/glass=50/90/50, with the total thickness being 190 $\mu$m) exhibits a remarkably improved impact resistance without appreciable cracking in the ball drop test at a height of 30 cm. This result suggests that the impact resistance of the display device substrate according to the present invention is more affected by stress imparted to the glass sheets by the hybrid material than by reduction in the thickness of the high-modulus glass sheet.

Consequently, it is recommended that glass sheets thinner than 100 $\mu$m be used to hold between them a thermosetting hybrid material which is about 100 $\mu$m thick. The resulting display device substrate is comparable or superior in impact resistance to the one formed from a 0.3 mm thick single glass sheet.

If the display device substrate according to the present invention is constructed such that the total thickness of the glass sheets is 200 $\mu$m or less and the thickness of the layer of hybrid material is 100 $\mu$m or above, with the total thickness of the substrate being 0.3 mm or more, it is superior in impact resistance to the one formed from a 0.3 mm thick single glass sheet.

The magnitude of the internal stress which is imparted to the glass sheets (200 $\mu$m thick) by the thermosetting hybrid material (100 $\mu$m thick) is calculated from the mathematical expressions (20) and (22).

The mathematical expression 20 permits one to calculate the strain $\epsilon g$ which occurs in the glass sheet (200 $\mu$m thick) due to the thermosetting hybrid material (100 $\mu$m thick).

Calculations need the following parameters.

$\Delta T$=(Curing temperature of hybrid material=160° C.)−(Temperature for evaluation of impact resistance=20° C.)=140° C. (=140K)

$\alpha g$ (coefficient of linear expansion of glass used)=$5.1\times10^{-6} K^{-1}$ $\alpha r$ (coefficient of linear expansion of hybrid material) =$88\times10^{-6} K^{-1}$ Eg (elastic modulus of glass)=72.5 GPa (Giga Pascal)
Er (elastic modulus of hybrid material)=2.4 GPa
Total thickness of glass sheets=200 μm (100 μm×2)
Thickness of hybrid material=100 μm
Thus, the value of $\epsilon g$ is calculated as follows.

$$|\epsilon g|=|\{(5.1\times10^{-6}K-88\times10^{-6}K)\times140K\times2.4\ GPa\times100\ \mu m\}/\{(2.4\ GPa\times100\ \mu m)+(72.5\ GPa\times200\ \mu m)\}|=1.9\times10^{-4} \quad (27)$$

It is known that a compressive strain of $1.9\times10^{-4}$ occurs in the glass sheets constituting the display device substrate with a structure of glass/HB/glass=100/100/100.

The foregoing suggests that the display device substrate according to the present invention will have as good an impact resistance as the one formed from a 0.3 mm thick single glass sheet, if it is formed such that a compressive strain no smaller than $1.9\times10^{-4}$ is imparted to a glass sheets no thicker than 200 μm, by selecting an adequate material and adequate thickness.

In this case, the glass sheets experience a compressive stress (σg) which is calculated from the mathematical expression (22) as follows.

$$\sigma g=1.9\times10^{-4}\times72.5\ GPa=13.8\ MPa \quad (28)$$

This implies that a compressive stress of 13.8 MPa is applied to the glass sheets, whose total thickness is 200 μm.

The internal compressive strain (stress) produces the effect of partly alleviating the tensile strain (stress) due to deformation, which is induced when the glass sheet receives an impact. Therefore, the substrate with an internal compressive strain is more resistant to deformation and impact than the one without an internal compressive strain.

The coefficient of linear expansion of glass is much smaller (1/10 or less) than that of plastics. ($\alpha g<<\alpha r$) On the other hand, the modulus of elasticity of plastics material is 1/30 to 1/40 of that of glass. This fact restricts the minimum thickness of the glass sheet that can be handled without difficulty. In the case of a substrate with a total thickness of 300 μm, each glass sheet should be no thinner than 25 μm. The thickness of the glass sheet should be five times at the highest compared to the thickness of the plastics sheet. (hr/hg<5)

In view of the foregoing, the mathematical expression (20) may be simplified, as shown in the mathematical expression (29), when it is applied to the display device substrate of laminate type according to the present invention.

$$|\epsilon g|=|\{\alpha r\times\Delta T\times(Er\times hr)\}/\{Eg\times hg\}| \quad (29)$$

The value of $\epsilon g$ calculated from the mathematical expression (29), with the above-mentioned parameters inserted, is $\epsilon g=1.9\times10^{-4}$. It is found that this value is substantially equal to the value calculated from the mathematical expression (20).

The foregoing suggests that the mathematical expression (2) should be satisfied so that the display device substrate is comparable or superior in impact resistance to a substrate formed from a 0.3 mm thick single glass sheet, if it has a total thickness no larger than 0.3 mm and the total thickness of the glass sheets is no larger than 200 μm.

$$\{\alpha r\times\Delta T\times(Er\times hr)\}/\{Eg\times hg\}\geq1.9\times10^{-4} \quad (2)$$

In view of the fact that the display device substrate is composed of a pair of glass sheets and a plastics sheet held between them, the glass sheets should have sufficient stiffness and crack resistance for their easy handling in the manufacturing process. The glass sheet meeting such requirements should preferably have a thickness of 30 μm or above, with the total thickness of the glass sheets being 60 μm or above.

It is known from experience in actual production of the display device substrate that the glass sheet for easy handling should preferably have a thickness of 50 μm or above, with the total thickness of the glass sheets being 100 μm or above.

For better handlability, the glass sheet should preferably have a thickness of 70 μm or above, with the total thickness of the glass sheets being 140 μm or above.

A review of the mathematical expression (2) indicates that the mathematical expression (3) should be satisfied so that the thickness of the glass sheet is 200 μm or less and the compressive strain in the glass sheet is $1.9\times10^{-4}$ or above.

$$\{\alpha r\times\Delta T\times(Er\times hr)\}\geq1.9\times10^{-4}\ 200\ \mu m\times72.5\ GPa\geq2800\ Pa\cdot m \quad (3)$$

In the case where the plastics material is heated at a temperature higher than Tg in the actual production process, (T is not the heating temperature in production, but is the difference between the Tg of the plastics material and the temperature at which the display device substrate is evaluated or used. Therefore, the important parameter of the plastics material is the difference between Tg and 20° C. (which is the average operating temperature), which is expressed by (Tg−20)° C. And, the mathematical expression (3) should be satisfied.

$$\{\alpha r\times(Tg-20)\times(Er\times hr)\}\geq2800\ Pa\cdot m \quad (30)$$

The mathematical expressions (3) and (30) may be rewritten as the mathematical expressions (4) and (31), respectively, if it is assumed that the plastics material has a modulus of elasticity higher than 1 GPa, more practically, higher than 2 GPa.

$$(\alpha r\times\Delta T\times hr)\geq2800\ Pa\cdot m/2\ GPa\geq1.4\times10^{-6}\ m \quad (4)$$

$$(\alpha r\times(Tg-20)\times hr)\geq2800\ Pa\cdot m/2\ GPa\geq1.4\times10^{-6}\ m \quad (31)$$

A review of the mathematical expression (2) indicates that the mathematical expression (5) should be satisfied so that the thickness of the glass sheet is 150 μm or less for sufficient weight reduction and the compressive strain in the glass sheet is $1.9\times10^{-4}$ or above for sufficient impact resistance.

Attempts to reduce the thickness of the glass sheet present difficulties in the handling of the glass sheet in the production of the display device substrate. Such difficulties can be obviated by selecting a comparatively soft plastics material from a broad range of candidates.

$$\{\alpha r\times\Delta T\times(Er\times hr)\}\geq1.9\times10^{-4}\times150\ \mu m\times72.5\ GPa\geq2100\ Pa\cdot m \quad (5)$$

As in the foregoing, it is necessary that the mathematical expression (32) be satisfied.

$$\{\alpha r \times (Tg-20) \times (Er \times hr)\} \geq 2100 \text{ Pa·m} \quad (32)$$

A review of the mathematical expression (2) indicates that the mathematical expression (6) should be satisfied so that the thickness of the glass sheet is 100 µm or less (for sufficient weight reduction) and the compressive strain in the glass sheet is 1.9 ($10^{-4}$ or above.

$$\{\alpha r \times \Delta T \times (Er \times hr)\} \geq 1.9 \times 10^{-4} \times 100 \text{ µm} \times 72.5 \text{ GPa} \geq 1400 \text{ Pa·m} \quad (6)$$

As in the foregoing, it is necessary that the mathematical expression (33) be satisfied.

$$\{\alpha r \times (Tg-20) \times (Er \times hr)\} \geq 1400 \text{ Pa·m} \quad (33)$$

The following discussion concerns the structure of a display device substrate which is comparable or superior in impact resistance to a substrate formed from a 0.5 mm thick single glass sheet in the case where the total thickness of the substrate is 0.3 mm or less.

As shown in the table in FIG. 7, the display device substrate is comparable in impact resistance to the one formed from a 0.5 mm thick single glass sheet, if it is composed of a pair of glass sheets whose total thickness is 100 µm and a plastics sheet of thermosetting hybrid material, whose thickness is 90 µm, held between them.

If the display device substrate is constructed such that the total thickness of the glass sheets is 140 µm and the thickness of the layer of thermosetting hybrid material is 140 µm, it is superior in impact resistance to one formed from a 0.5 mm thick single glass sheet and it is also superior in impact resistance to one which is composed of a pair of glass sheets (each 50 µm thick) and a layer of thermosetting hybrid material (90 µm thick) held between them.

The stress in the glass sheets is calculated from the mathematical expressions (20) and (22) if the display device substrate has a total thickness of 100 µm and the layer of thermosetting hybrid material has a thickness of 90 µm.

The strain (εg) that is induced in the glass sheets is calculated as follows from the mathematical expression (20).

$$|\epsilon g|=3.4\times 10^{-4}$$

The stress (σg) in the glass sheets is calculated as σg=3.4×$10^{-4}$×72.5 GPa=240 MPa. Therefore, the display device substrate with a total thickness no larger than 0.3 mm would be superior in impact resistance to one which is formed from a 0.5 mm thick single glass sheet, if it satisfies the mathematical expressions (7) and (8).

$$\{\alpha r \times \Delta T \times (Er \times hr)\}/\{(Er \times hr)+(Eg \times hg)\} \geq 3.4 \times 10^{-4} \quad (7)$$

$$\{\alpha r \times \Delta T \times (Er \times hr)\}/\{Eg \times hg\} \geq 3.4 \times 10^{-4} \quad (8)$$

In view of the fact that the display device substrate is composed of a pair of glass sheets and a plastics sheet held between them, the glass sheets should have sufficient stiffness and crack resistance to provide for easy handling in the manufacturing process. A glass sheet meeting such requirements should preferably have a thickness of 30 µm or above, with the total thickness of glass sheets being 60 µm or above.

It is known from experience in actual production of the display device substrate that the glass sheet for easy handling should preferably have a thickness of 50 µm or above, with the total thickness of glass sheets being 100 µm or above.

For better handleability, the glass sheet should preferably have a thickness of 70 µm or above, with the total thickness of glass sheets being 140 µm or above.

A review of the mathematical expression (8) indicates that the mathematical expression (9) should be satisfied so that the thickness of the glass sheet is 140 µm or less for sufficient weight reduction and the compressive strain in the glass sheet is 3.4×$10^{-4}$ or above for sufficient impact resistance.

Attempts to reduce the thickness of the glass sheet present difficulties in the handling of the glass sheet in the production of the display device substrate. Such difficulties can be obviated by selecting a comparatively soft plastics material from a broad range of candidates.

$$\{\alpha r \times \Delta T \times (Er \times hr)\} \geq 3.4 \times 10^{-4} \times 140 \text{ µm} \times 72.5 \text{ GPa} \geq 3500 \text{ Pa·m} \quad (9)$$

In view of the mathematical expression (9) and the actual manufacturing process, ΔT is the difference between the Tg of the plastics material and the temperature at which the display device substrate is evaluated or used. Therefore, the important parameter of the plastics material is the value expressed by (Tg−20)° C. And, the mathematical expression (34) should be satisfied.

$$\{\alpha r \times (Tg-20) \times (Er \times hr)\} \geq 3500 \text{ Pa·m} \quad (34)$$

The mathematical expressions (9) and (34) may be rewritten as the mathematical expressions (10) and (35), respectively, if it is assumed that the plastics material has a modulus of elasticity higher than 1 GPa, more practically, higher than 2 GPa.

$$(\alpha r \times \Delta T \times hr) \geq 1.7 \times 10^{-6} \text{ m} \quad (10)$$

$$(\alpha r \times (Tg-20) \times hr) \geq 2\ 1.7 \times 10^{-6} \text{ m} \quad (35)$$

A review of the mathematical expression (8) indicates that the mathematical expression (11) should be satisfied so that the thickness of the glass sheet is 100 µm or less for sufficient weight reduction and the compressive strain in the glass sheet is 3.7×$10^{-4}$ or above.

$$\{\alpha r \times \Delta T \times (Er \times hr)\} \geq 3.4 \times 10^{-4} \times 100 \text{ µm} \times 72.5 \text{ GPa} \geq 2500 \text{ Pa·m} \quad (11)$$

In view of the mathematical expression (11) and the actual manufacturing process, ΔT is the difference between the Tg of the plastics material and the temperature at which the display device substrate is evaluated or used. Therefore, the important parameter of the plastics material is the value expressed by (Tg−20)° C. And, the mathematical expression (45) should be satisfied.

$$\{\alpha r \times (Tg-20) \times (Er \times hr)\} \geq 2500 \text{ Pa·m} \quad (36)$$

The mathematical expressions (11) and (36) may be rewritten as the mathematical expressions (12) and (37), respectively, if it is assumed that the plastics material has a modulus of elasticity higher than 1 GPa, more practically, higher than 2 GPa.

$$(\alpha r \times \Delta T \times hr) \geq 1.2 \times 10^{-6} \text{ m} \quad (12)$$

$$(\alpha r \times (Tg-20) \times hr) \geq 1.2 \times 10^{-6} \text{ m} \quad (37)$$

The foregoing discussion suggests that the mathematical expression (13) or (14) should be satisfied so that the display device substrate of the present invention is comparable or superior in impact resistance and visibility to the one formed from a 0.5 mm thick single glass sheet, if it has a total thickness of 0.2 mm or less.

$$\{\alpha r \times \Delta T \times (Er \times hr)\}/\{(Er \times hr)+(Eg \times hg)\} \geq 3.4 \times 10^{-4} \quad (13)$$

$$\{\alpha r \times \Delta T \times (Er \times hr)\}/\{(Eg \times hg)\} \geq 3.4 \times 10^{-4} \quad (14)$$

In view of the fact that the display device substrate is composed of a pair of glass sheets and a plastics sheet held between them, the glass sheets should have sufficient stiffness and crack resistance for their easy handling in the manufacturing process. The glass sheet meeting such requirements should preferably have a thickness of 30 $\mu$m or above, with the total thickness of the glass sheets being 60 $\mu$m or above.

It is known from experience in the actual production of the display device substrate that the glass sheet for easy handling should preferably have a thickness of 50 $\mu$m or above, with the total thickness of glass sheets being 100 $\mu$m or above.

For better handleability, the glass sheet should preferably have a thickness of 70 $\mu$m or above, with the total thickness of glass sheets being 140 $\mu$m or above.

The review of the mathematical expression (14) indicates that the mathematical expression (15) should be satisfied so that the thickness of the glass sheet is 100 $\mu$m or less for sufficient weight reduction and the compressive strain in the glass sheet is $3.4 \times 10^{-4}$ or above for sufficient impact resistance.

Attempts to reduce the thickness of the glass sheet present difficulties in the handling of the glass sheet in the production of the display device substrate. Such difficulties can be obviated by selecting a comparatively soft plastics material from a broad range of candidates.

$$\{\alpha r \times \Delta T \times (Er \times hr)\} \geq 3.4 \times 10^{-4} \times 100 \ \mu m \times 72.5 \ GPa \geq 2500 \ Pa \cdot m \quad (15)$$

In view of the mathematical expression (15) and the actual manufacturing process, $\Delta T$ is the difference between the Tg of the plastics material and the temperature at which the display device substrate is evaluated or used. Therefore, the important parameter of the plastics material is the value expressed by (Tg–20)° C. And, the mathematical expression (38) should be satisfied.

$$\{\alpha r \times (Tg-20) \times (Er \times hr)\} \geq 2500 \ Pa \cdot m \quad (38)$$

The mathematical expressions (15) and (38) may be rewritten as the mathematical expressions (16) and (39), respectively, if it is assumed that the plastics material has a modulus of elasticity higher than 1 GPa, more practically, higher than 2 GPa.

$$(\alpha r \times \Delta T \times hr) \geq 1.2 \times 10^{-6} \ m \quad (16)$$

$$(\alpha r \times (Tg-20) \times hr) \geq 1.2 \times 10^{-6} \ m \quad (39)$$

The following discussion is about the structure of the display device substrate which is comparable or superior in impact resistance to a substrate formed from a 0.5 mm thick single glass sheet in the case where the total thickness of the substrate is 0.3 mm or less.

As shown in the table in FIG. 7, the display device substrate is comparable in impact resistance to the one formed from a 0.5 mm thick single glass sheet, if it is composed of a pair of glass sheets whose total thickness is 140 $\mu$m and a plastics sheet of thermosetting hybrid material whose thickness is 140 $\mu$m held between them.

The stress in the glass sheets is calculated from the mathematical expressions (20) and (22), if the display device substrate has a total thickness of 140 $\mu$m and the layer of thermosetting hybrid material has a thickness of 140 $\mu$m.

The compressive strain ($\epsilon g$) that is induced in the glass sheets is calculated as follows from the mathematical expression (20).

$$|\epsilon g| = 5.0 \times 10^{-4}$$

The stress ($\sigma g$) in the glass sheets is calculated as $\sigma g = 5.0 \times 10^{-4} \times 72.5 \ GPa = 363 \ MPa$. Therefore, the display device substrate with a total thickness no larger than 0.3 mm would be superior in impact resistance to the one which is formed from a 0.5 mm thick single glass sheet, if it satisfies the mathematical expressions (17) and (8).

$$\{(\alpha g - \alpha r) \times \Delta T \times (Er \times hr)\} / \{(Er \times hr) + (Eg \times hg)\} \geq 5.0 \times 10^{-4} \quad (17)$$

$$\{\alpha r \times \Delta T \times (Er \times hr)\} / \{Eg \times hg\} \geq 5.0 \times 10^{-4} \quad (40)$$

In view of the fact that the display device substrate is composed of a pair of glass sheets and a plastics sheet held between them, the glass sheets should have sufficient stiffness and crack resistance for their easy handling in the manufacturing process. The glass sheet meeting such requirements should preferably have a thickness of 50 $\mu$m or above, with the total thickness of glass sheets being 100 $\mu$m or above.

It is known from experience in actual production of the display device substrate that the glass sheet for easy handling should preferably have a thickness of 50 $\mu$m or above, with the total thickness of glass sheets being 100 $\mu$m or above.

For better handleability, the glass sheet should preferably have a thickness of 70 $\mu$m or above, with the total thickness of glass sheets being 140 $\mu$m or above.

The display device substrate according to the present invention has a plastics sheet held between a pair of glass sheets. This plastic sheet will be explained in the following.

In the display device substrate according to the present invention, the plastics sheet held between a pair of glass sheets should be formed from a material which can give the glass sheets a sufficient compressive strain for the substrate to have a desired impact resistance. Any plastics material can be used so long as it meets the above-mentioned requirements.

The plastics sheet held between the paired glass sheets should preferably be formed from a thermosetting material so that the display device substrate has a good impact resistance. However, polyurethane should be excluded although it is thermosetting, because it is too soft to impart compressive stress. A hard plastics, such as epoxy resin, is desirable.

An uncolored epoxy resin is desirable because it permits the display device substrate to have a high light transmission.

A desirable plastics material is one which has a high glass transition point (Tg) so that it imparts a large compressive stress to the glass sheets. The higher the Tg, the larger the $\Delta T$ (temperature difference), as indicated by the mathematical expression (20). An effective way of increasing the Tg of the plastics material is by incorporation with an inorganic material. It is desirable to use an inorganic-organic hybrid material which has both the advantage of an organic material and the advantage of an inorganic material (good mechanical properties at high temperatures and good heat resistance).

The upper limit of the range of temperature variation is usually determined by the Tg. An example of the inorganic-organic hybrid material that can be used is one which is synthesized from a thermosetting resin and an organosilicon compound, the former being produced by a new process of addition polymerization disclosed in Japanese Patent Laid-open No. 2000-109709.

Being based on a hard epoxy resin, the hybrid material is hard and has a high Tg. Its additional advantage is that, when a temperature exceeding Tg is applied at the time of substrate production, the upper limit of the range of temperature variation (ΔT) is not Tg, but the temperature applied.

Figure 8:
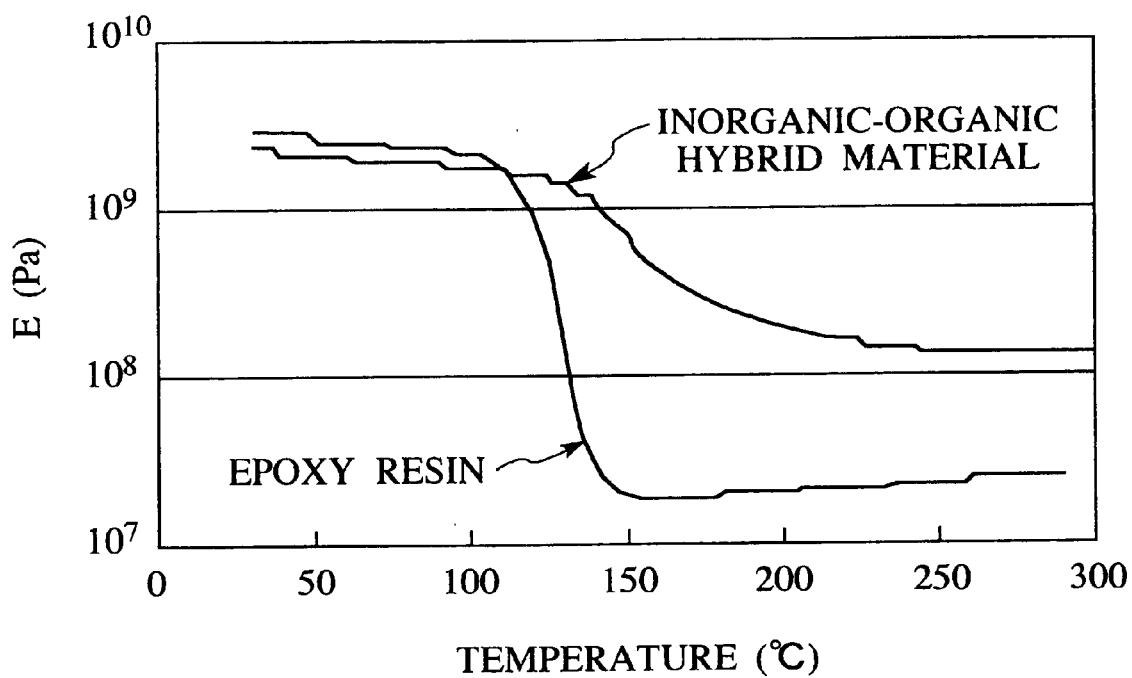
FIG. 8 is a graph showing the viscoelastic properties of the inorganic-organic hybrid material (used for the display device substrate in the embodiment of the present invention) and the epoxy resin for comparison.

FIG. 8 is a graph showing the viscoelastic properties of the inorganic-organic hybrid material (used for the display device substrate in the embodiment of the present invention) and the epoxy resin for comparison.

The structure and manufacturing process of the inorganic-organic hybrid material will be described in detail later. It decreases in elastic modulus much less than an epoxy resin and other plastics materials even at a temperature above the Tg, as shown in FIG. 8.

Therefore, the range of temperature variation (ΔT) may be defined as ΔT=(Resin curing temperature)–(Product operating temperature).

The foregoing means that the compressive stress imparted to the glass sheets is proportional to the temperature which is applied to the hybrid material during the manufacturing process. Therefore, it is possible to produce a very large compressive stress, as desired.

The inorganic-organic hybrid material used for the display device substrate of the present invention should preferably be one which is synthesized from a thermosetting resin of the addition polymerization type and an organosilicon compound. One based on an epoxy resin and silicone is desirable because of its high transmission and its good film-forming ability.

The inorganic-organic hybrid material that can be used for the display device substrate of the present invention has a molecular structure as will be explained in the following.

The inorganic-organic hybrid material should preferably be formed from a compound represented by the chemical formula (3) or (4) and a thermosetting resin of the addition polymerization type. Before use, it is incorporated with a hardener for the thermosetting resin. It has a low viscosity before it is cured, and hence it can be readily molded to have a desired shape, thereby facilitating the production of the display device substrate.

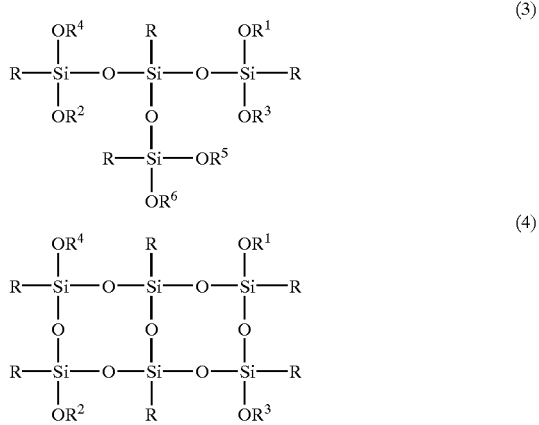

(where R denotes an organic group having a functional group capable of reaction with the hardener for the thermosetting resin, and $R^1$ to $R^6$ each denote a silicon-containing group having 0 to 3 repeating units represented by $(SiOR_{3/2})$.)

One way to produce the inorganic-organic hybrid material is by a sol-gel process. This process permits fine powder on the order of micrometer or less of a metal oxide or an organometal oxide to be formed in the matrix of high polymer at a temperature low enough (say, 100–150° C.) for the organic compound to remain intact. Therefore, hybridization can be accomplished by using the sol-gel process, which permits an epoxy resin to be used as a matrix of organic polymer.

The sol-gel process for hybridization with an epoxy resin and an epoxy-type organosilicon alkoxide involves the reactions represented by the chemical equations (5) and (6).

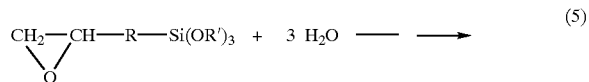

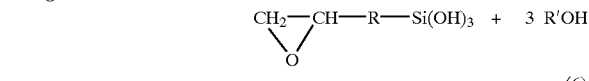

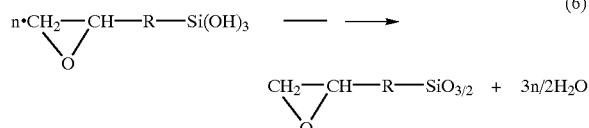

(where R and R' each denote an organic group.) The chemical equation (5) represents hydrolysis of an organosilicon alkoxide with evolution of alcohol, and the chemical equation (6) represents condensation reaction with dehydration of hydroxy organosilicon.

The reactions represented by the chemical equations (5) and (6) are carried out in n epoxy resin. At an adequate stage of the reaction, a hardener for the epoxy resin is added. Examples of the hardener include amine compounds, quaternary ammonium salts, dicyandiamide, carboxylic acid anhydride, boron trifluoride-amine complex, hydrazide of organic acid, imidazole compounds, phenol, cresol, xylenol, and phenolic resin. Addition reactions take place among epoxy groups in the organosilicon compound, epoxy groups in the epoxy resin, and amino groups in the hardener.

The reaction eventually gives rise to an inorganic-organic hybrid material of epoxy-silicon type which contains a uniformly dispersed organosilicon compound forming covalent bonding with the hardener. This hybrid material can be used to manufacture the display device substrate.

An open system may be employed for the reactions represented by the chemical equations (5) and (6) to be performed in an epoxy resin.

The reactions may be carried out under a nitrogen stream by using a reaction vessel equipped with a distillatory apparatus which removes at least part of the evolved alcohol and water from the system.

Removal of alcohol and water by distillation promotes the sol-gel process, thereby saving reaction time and substrate manufacturing time. Distillation is more desirable than evacuation because it permits smooth reactions and prevents abrupt reactions which cause discoloration of reaction products. Discolored reaction products are detrimental to the transmission of the display device substrate.

In addition, reactions under a nitrogen stream are isolated from oxygen, so that the reaction product or the inorganic-organic hybrid material is immune from discoloration. The reaction product free of discoloration contributes to the display device substrate having a high transmission.

The advantage of carrying out the reaction while removing alcohol and water as reaction by-products is that the reaction product which is a hydrolyzate of an organosilicon alkoxide is thermally stable.

The result is a long pot life for the mixture of the epoxy resin and the hydrolyzate of organosilicon alkoxide. This means that the reaction can be performed to give a large amount of product which is used later little by little for production of the display device substrate.

This in turn contributes to simplification and cost reduction in production of the display device substrate.

The reaction may also be carried out under a nitrogen stream by using a reaction vessel equipped with a reflux condenser in such a way that the revolved alcohol and water are returned to the reaction vessel during reaction.

The reaction with refluxing promotes the sol-gel process, thereby reducing the reaction time and substrate manufacturing time. Reactions under a nitrogen stream prevents the reaction product or the inorganic-organic hybrid material from discoloration. The reaction product free of discoloration contributes to the display device substrate having a high transmission.

The reactions represented by the chemical equations (5) and (6) may also be carried out in the following way. First, they are previously carried out independently so as to give an oligomer of the organosilicon alkoxide. Then, the resulting oligomer is mixed with an epoxy resin. The mixture is incorporated with a hardener for reaction to yield the inorganic-organic hybrid material of epoxy-silicon type.

Oligomerization preceding the reaction with an epoxy resin prevents side reactions which would otherwise take place in the sol-gel process. This prevents discoloration of the epoxy resin and, hence, gives rise to a clear hybrid material.

The epoxy resin suitable for the hybrid material includes that of the glycidyl ether type composed mainly of a phenolic compound such as bisphenol-A, bisphenol-F, tetrabromobisphenol-A, tetraphenylolethane, phenol-novolak, and o-cresol-novolak; that of the glycidyl ether type composed mainly of an alcoholic compound such as polypropylene glycol and hydrogenated bisphenol-A; that of the glycidyl ester type composed mainly of hexahydrophthalic anhydride or dimmer acid; that of the glycidyl amine type composed mainly of diaminophenylmethane, isocyanuric acid, or hydantoin; that of the mixed type composed mainly of p-aminophenol or p-oxybenzoic acid; that composed mainly of an ester represented by the chemical formula (2) below; and a mixture thereof.

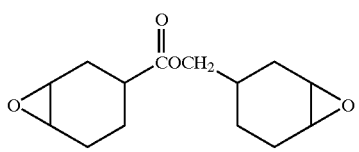

(2)

The hybrid material used for production of the display device substrate should contain a prescribed amount of silicon. The silicon content is expressed in terms of $SiO_2$. It is calculated by dividing the amount of silicon in terms of $SiO_2$ in the organosilicon compound by the total amount of epoxy resin, hardener, and hydrolyzed organosilicon alkoxide.

The silicon content (in terms of $SiO_2$) in the hybrid material should be more than 0 wt % and less than 30 wt %, so that the hybrid material has a good heat resistance characteristic of inorganic materials.

With a silicon content (in terms of $SiO_2$) more than 30 wt %, the hybrid material has difficulties in uniform dispersion of the compound represented by the chemical formulas (3) or (4). It leads to a display device substrate that is poor in impact resistance.

The silicon content (in terms of $SiO_2$) should preferably be no less than 4 wt % and no more than 15 wt %.

With a silicon content (in terms of $SiO_2$) no less than 4 wt %, the hybrid material produces a marked effect due to inorganic-organic hybridization and contributes to a display device substrate that is superior in heat resistance. With a silicon content no more than 15 wt %, the hybrid material permits uniform dispersion of the compound represented by the chemical formulas (3) or (4) and contributes to display device substrate that is superior in impact resistance.

As mentioned above, the display device substrate according to the present invention is composed of a pair of glass sheets and a layer of plastics materials held between them, so that it is light in weight and small in thickness and yet it is highly reliable with good a impact resistance.

EXAMPLES

The invention will be described in more detail with reference to the following examples, which demonstrate the display device substrate and the display device formed therewith.

Example 1

This example demonstrates the display device substrate according to the present invention. The first step is to prepare a varnish as a starting material for the layer of the inorganic-organic hybrid material composed of an epoxy resin and an organosilicon compound.

The following reactants are placed in a reaction vessel so that the silicon content (in terms of $SiO_2$) therein is 8 wt %.

13.2 g of 3-glycidoxypropyltrimethoxysilane (GTMS for short hereinafter) represented by the chemical formula (7).

1.3 g of purified water.

0.13 g of di-n-butyltin dilaurate

The reactants are mixed and allowed to stand overnight at room temperature.

The reaction vessel is given 30 g of an epoxy resin represented by the chemical formula (8). The reactants are stirred at room temperature for 30 minutes.

The reaction vessel is provided with a distillatory apparatus. The reactants are heated at 150° C. with stirring for 4 hours. Reaction is carried out under a nitrogen stream, and methanol and water are removed from the reaction liquid by distillation.

After cooling to room temperature, the reaction liquid is given 16.5 g of phenolic resin as a hardener for the epoxy resin represented by the chemical formula (10) and 0.3 g of triphenylphosphine as a cure accelerator. The reactants are heated at 80° C. for 2 minutes.

Figure 9:
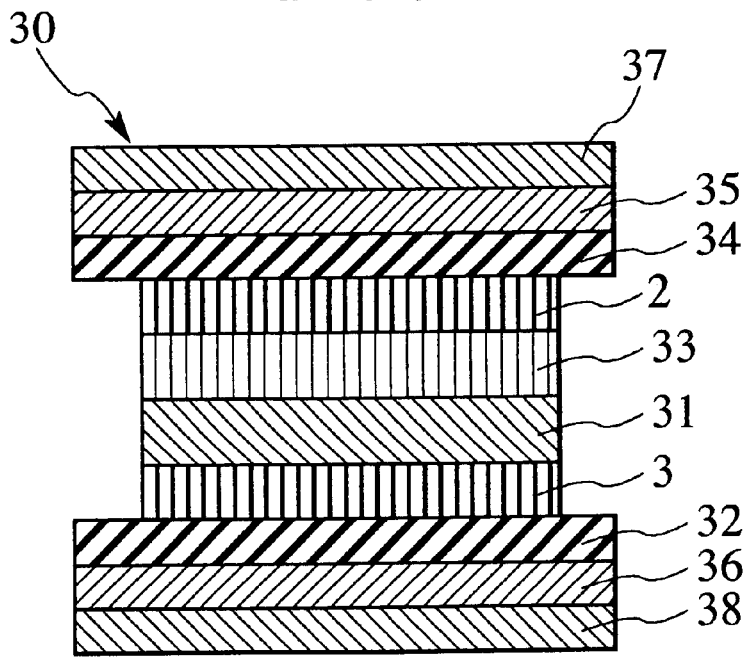
FIG. 9 is a diagram illustrating the method for press-forming the display device substrate in the first embodiment of the present invention.

FIG. 9 is a diagram illustrating the method press-forming the display device substrate in accordance with the first embodiment of the present invention.

The display device substrate in this example is formed by press molding as shown in FIG. 9.

The varnish 31, which has been prepared as mentioned above, is cast onto a glass sheet 3 measuring 30 mm by 70 mm and 70 μm thick. This glass sheet is previously heated at 120° C. and placed on a polyimide sheet 32.

On the varnish 31, there is placed another glass sheet 2 measuring 30 mm by 70 mm and 70 μm thick and another polyimide sheet 34 (50 μm thick), with a spacer 33 interposed between them so that the resulting display device substrate is about 0.3 mm thick, which is much thinner than an ordinary glass substrate.

The thus obtained laminate is held between a pair of stainless steel mirror plates 35 and 36 (2 mm thick). The entire assembly is held between layers of amide fiber 37 and 38 (3.8 mm thick). Finally, press molding is performed to produce the press molding assembly 30.

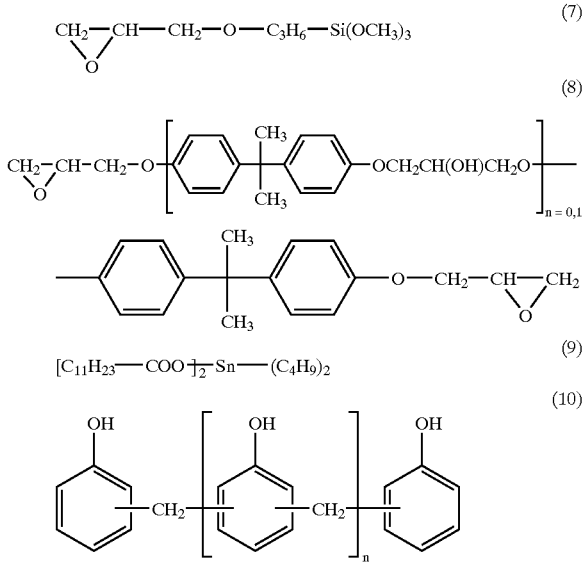

The press molding assembly is pressed at 120° C. for 15 minutes and then at 160° C. for 120 minutes.

As a result of press the molding, there is obtained the display device substrate shown in FIG. 2, which is composed of a pair of glass sheets 2 and 3 and a layer 4 (140 μm thick) of the inorganic-organic hybrid material of epoxy-silicon type held between the glass sheets. This substrate measures 30 mm by 70 mm and 0.28 mm thick (with a structure of glass/HB/glass=70/140/70).

The thus obtained display device substrate 1 has an internal compressive strain in the glass sheets 2 and 3. The internal compressive strain in the glass sheets 2 and 3 is imparted by the layer 4 of the inorganic-organic hybrid material of epoxy-silicon type held between the glass sheets.

The above-mentioned inorganic-organic hybrid material of epoxy-silicone type used in this example has the following physical properties.

Tg=145° C.
ΔT=(Curing temperature of hybrid material=160° C.)–(Temperature at which impact resistance is evaluated=20° C.)=140° C. (=140K)
$\alpha r$ (Coefficient of linear expansion of hybrid material)=88×$10^{-6}K^{-1}$
Er (Elastic modulus of hybrid material)=2.4 GPa
Thickness of hybrid material=140 μm The glass sheets used in this example have the following physical properties.

$\alpha g$ (Coefficient of linear expansion of glass)=5.1×$10^{-6}K^{-1}$
Eg (Elastic modulus of glass)=72.5 GPa
Total thickness of glass sheets=140 μm (70 μm×2)

It is found from the foregoing physical properties and the mathematical expression (20) that the internal compressive strain in the glass sheets 2 and 3 is 4×$10^{-4}$.

Likewise, the value of $\{(\alpha r \times \Delta T \times (Er \times hr)\}/(Eg \times hg)$ according to the mathematical expression (26) is 4×$10^{-4}$. Similarly, the value of $\{\alpha r \times \Delta T \times (Er \times hr)\}$ is 4100 Pa·m and the value of $\{\alpha r \times \Delta T \times hr\}$ is 3.0×$10^{-6}$. Thus, the relation defined by the mathematical expressions 3 and 4 are satisfied.

The display device substrate 1 obtained in this example was measured for light transmission. It was found that the transmission of light with a wavelength of 400 nm and 540 nm was 93% and 97%, respectively.

The foregoing results suggest that the present invention can provide a display substrate having a very high transmission.

The display device substrate 1 obtained in this example was measured for weight. The sample measures 10 mm by 10 mm in size. The weight was compared with that of a 0.3 mm thick glass sheet.

It was found that the display device substrate 1 in this example is as light as 0.0455 g, whereas the glass sheet for comparison weighs 0.0713 g. In other words, the former is lighter than the latter by about 40% even though they have the same thickness.

The foregoing suggests that the present invention can provide a light display device substrate.

The display device substrate obtained in Example 1 was tested for heat resistance.

The sample was allowed to stand in an oven at 150° C. for 1 hour, and then it was visually examined for discoloration. No discoloration was noticed.

Another sample was allowed to stand in an oven at 200° C. for 1 hour, and then it was examined for discoloration by measuring its transmission. The transmission of light with a wavelength of 400 nm and 540 nm was 91% and 98%, respectively. It was found that the sample retained high transmission even after heating.

The foregoing suggests that the display device substrate 1 in this example has a good heat resistance. The present invention can provide a light display device substrate with good heat resistance.

The layer of the inorganic-organic hybrid material of epoxy-silicone type was examined for viscoelastic properties in the following manner. The hybrid material was held between two polyimide sheets without using glass sheets and the assembly was pressed for curing.

A sample for comparison was prepared from an epoxy resin represented by the chemical formula (8), a phenolic resin represented by the chemical formula (10) as a hardener for the epoxy resin, and triphenylphosphine as a cure accelerator, without using GTMS, purified water, and di-n-butyltin dilaurate. The sample was press-formed under the same conditions as mentioned above. Thus, there was obtained an unhybridized sample of the epoxy resin.

These samples were examined for viscoelastic properties. The results are shown in FIG. 8.

It is noted from FIG. 8 that the sample of the epoxy resin for comparison decreases in viscoelasticity steeply in the neighborhood of 145° C. or the glass transition point (Tg), whereas the sample of the hybrid material decreases in viscoelasticity only slightly in the neighborhood of 145° C. In other words, as compared with the sample for comparison, the sample in this example is higher in viscoelasticity at Tg and above that value by more than one order of magnitude.

Example 2

This example is intended to determine how the impact resistance is related with the total thickness of the display device substrate, the thickness of the glass sheet, and the thickness of the plastics layer. The example is also intended to find the optimal condition for the display device substrate to have an impact resistance better than that of a 0.3 mm or 0.5 mm thick glass sheet despite its light weight and small thickness. In this example, several kinds of display device substrates were prepared, which differ in the total thickness of the display device substrate, the thickness of the glass sheet, and the thickness of the plastics layer.

Samples differing in the thickness (50, 100, and 200 μm) of the glass sheet were prepared from the same varnish as used in Example 1 for the display device substrate with a structure of glass/HB/glass=70/140/70. Other samples differing in the thickness of the spacer used in pressing, and hence differing in the thickness of hybrid material, were prepared under the same condition as in Example 1.

Thus, three kinds of samples having the following structure were obtained.

Glass/HB/glass=50/90/50

Glass/HB/glass=100/100/100

Glass/HB/glass=200/420/200

These three samples were found to have a transmission of 98%, 94%, and 85%, respectively, for a wavelength of 400 nm. They were free of warpage and distortion and had a high transmission.

Example 3

The four samples of the following structure which were prepared in Examples 1 and 2 were examined for impact resistance. Glass/HB/glass=70/140/70, 50/90/50, 100/100/100, and 200/420/200.

The test method for evaluation is schematically shown in FIG. 6. It consists of dropping a steel ball 22 (12.7 mm in diameter and 8.343 g in weight) onto the center of the sample 21 (measuring 30 mm by 70 mm) placed on a wood stand. The impact resistance of the sample is rated by whether or not cracking occurs in the sample.

For the purpose of comparison, the same ball test as above was performed on the samples of glass sheets differing in thickness (50, 100, 200, 300, and 500 $\mu$m).

The table in FIG. 7 shows the results of tests on the display device substrates according to the present invention and the glass substrate for comparison.

It is noted that the display device substrate with a structure of glass/HB/glass=100/100/100 has the same impact resistance as the 0.3 mm thick glass sheet.

It is noted that the display device substrate with a structure of glass/HB/glass=50/90/50 has the same impact resistance as the 0.5 mm thick glass sheet.

In addition, it is noted that the display device substrate with a structure of glass/HB/glass=70/140/70 has a better impact resistance than the 0.5 mm thick glass sheet.

It is apparent from the foregoing that the display device substrate according to the present invention is superior in impact resistance. The present invention can provide a display device substrate with good impact resistance.

Example 4

This example demonstrates a liquid crystal display device of TN (twist-nematic) mode, which is formed with the display device substrate having a structure (glass/HB/glass=70/140/70) obtained in Example 1 above.

The display device substrate obtained in Example 1 underwent known sputtering at 200° C. to form on one side thereof a 100 nm thick layer of ITO (indium-tin oxide) as a transparent conducting material.

The resulting substrate with an ITO electrode is flat and highly transparent.

The ITO layer was etched to form electrodes in a stripe pattern. Each electrode is 6 mm wide and spaced 0.5 mm from adjacent ones.

That side of the substrate on which electrodes are formed was coated by spin coating with a varnish (with 2% solids) of polyamic acid as a precursor of polyamide. The coated substrate was dried at 80° C. for solvent removal and then baked at 200° C. for 15 minutes. In this way there was formed a polyimide alignment film (100 nm thick) on the electrodes.

The polyimide alignment film underwent rubbing by using a rubbing machine (from Fujioka) equipped with a rubbing roll (100 mm in diameter) wrapped with a rayon cloth. Rubbing was carried out under the following conditions.

Rubbing roll speed: 1000 rpm

Substrate feed rate: 30 mm/second

Pushing depth: 0.4 mm (Pushing depth is the length of fibers pushed down by the surface of the polyimide alignment film.) The rubbing direction is parallel to the long axis of the stripe electrodes.

After rubbing, a sealing material (thermosetting resin) was applied to the alignment film around the display region on one substrate with electrodes, and a spacer was scattered onto the alignment film of the other substrate with electrodes.

The two substrates were bonded together, with the alignment films facing each other, in such a way that the rubbing directions (or the liquid crystal aligning directions) on the alignment film were perpendicular to each other, and that the two substrates were slightly dislocated a few millimeters from each other to facilitate wiring to the electrodes to which a voltage is applied from outside. The two substrates were pressed at 150° C. for 2 hours, so that they were firmly bonded together. Thus, there was obtained an LCD panel. The gap between the two substrates was 5 $\mu$m.

The thus obtained LCD panel was filled with a liquid crystal material through an opening in the seal. The opening was closed with a UV-curable resin.

To both sides of the LCD panel were attached polarizers in cross-Nicol arrangement. One of the polarizers was placed such that its axis of polarization coincided with the rubbing direction (liquid crystal alignment direction) of the alignment film formed on the substrate on which it was placed.

In this way, there was obtained a liquid crystal display device of the TN mode, which has normally open characteristics (in which a white display appears when the applied voltage is low and a black display appears when the applied voltage is high).

A voltage (4V) was applied to the LCD panel through the exposed electrodes of the two substrates. The voltage application caused the liquid crystal to change in orientation. The white display region without voltage application turned to black.

This example proved that the display device substrate obtained in Example 1 can be made into a liquid crystal display device via the process of LCD panel fabrication. In other words, it was found that the display device substrate obtained in Example 1 is adaptable to the conventional LCD manufacturing process on account of ITO electrodes formed thereon, and that it can be used to form a liquid crystal display device.

The display device substrate according to the present invention meets requirements for weight reduction, thickness reduction, high reliability (good gas barrier properties), good heat resistance, and good impact resistance.

The present invention provides a display device substrate of laminate structure composed of glass sheets and a plastics sheet, which is comparable or superior in impact resistance to a substrate formed with a 0.3 mm thick glass sheet alone, because the plastics sheet protects the glass sheets from cracking.

The present invention provides a liquid crystal display device or an organic EL device, which is light in weight and small in thickness and is superior in impact resistance and display quality, by utilizing a conventional material and manufacturing process.

The present invention provides a display device substrate which is light in weight and small in thickness and superior in impact resistance.

What is claimed is:

1. An improved display device substrate which is composed of a pair of glass sheets facing each other and a layer of plastics material interposed between said paired glass sheets, wherein said improvement comprises said glass sheets having an internal compressive strain.

2. The display device substrate as defined in claim 1, wherein said glass sheets have an internal compressive strain ascribed to the layer of plastics material interposed between them.

3. The display device substrate as defined in claim 1 or 2, wherein said layer of plastics material is that of a thermosetting resin excluding polyurethane.

4. The display device substrate as defined in claim 1 or 2, wherein said layer of plastics material is that of epoxy resin.

5. The display device substrate as defined in claim 1 or 2, wherein said layer of plastics material is that of inorganic-organic hybrid material.

6. The display device substrate as defined in claim 1 or 2, wherein said layer of plastics material is that of epoxy-silicone-based inorganic-organic hybrid material.

7. The display device substrate as defined in claim 1 or 2, wherein said layer of plastics material is that of epoxy-silicone-based inorganic-organic hybrid material synthesized from an epoxy resin and an organosilicon compound.

8. The display device substrate as defined in claim 1 or 2, wherein said layer of plastics material is that of inorganic-organic hybrid material synthesized from an epoxy-type organosilicon alkoxide represented by the chemical formula (1) below;

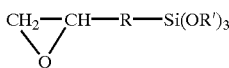

(where R and R' each denote an organic group).

9. The display device substrate as defined in claim 1 or 2, wherein said layer of plastics material is that of inorganic-organic hybrid material synthesized from any of epoxy resin of glycidyl ether type composed mainly of a phenolic compound such as bisphenol-A, bisphenol-F, tetrabromobisphenol-A, tetraphenylolethane, phenol-novolak, and o-cresol-novolak; epoxy resin of glycidyl ether type composed mainly of an alcoholic compound such as polypropylene glycol and hydrogenated bisphenol-A; epoxy resin of glycidyl ester type composed mainly of hexahydrophthalic anhydride or dimmer acid; epoxy resin of glycidyl amine type composed mainly of diaminophenylmethane, isocyanuric acid, or hydantoin; epoxy resin of mixed type composed mainly of p-aminophenol or p-oxybenzoic acid; and epoxy resin composed mainly of an ester represented by the chemical formula (2) below;

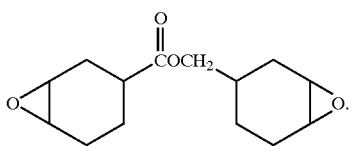

10. The display device substrate as defined in claim 6, wherein said layer of plastics material contains a silicon component (in terms of $SiO_2$) in an amount more than 0 wt % and less than 30 wt %.

11. The display device substrate as defined in claim 6, wherein said layer of plastics material contains a silicon component (in terms of $SiO_2$) in an amount more than 4 wt % and less than 15 wt %.

12. The display device substrate as defined in claim 1 or 2, wherein said glass sheets have an internal compressive strain no less than $1.9 \times 10^{-4}$.

13. The display device substrate as defined in claim 1 or 2, which has a thickness no larger than 0.3 mm.

14. The display device substrate as defined in claim 1 or 2, which satisfies the relation represented by the mathematical expression (1) below;

$$|\{(\alpha g - \alpha r) \times \Delta T \times (Er \times hr)\}/\{(Er \times hr)+(Eg \times hg)\}| \geq 1.9 \times 10^{-4} \qquad (1)$$

(where $\Delta T$ denotes a difference between the operating temperature of the display device substrate and the glass transition point (Tg) of the plastics material or the maximum temperature to be reached by the plastics material during its curing or molding if the latter is lower than the former.)

$\alpha g$=coefficient of linear expansion of glass used
$\alpha r$=coefficient of linear expansion of plastics material
$Eg$=elastic modulus of glass
$Er$=elastic modulus of plastics material
$hg$=total thickness of glass sheets
$hr$=thickness of plastics material.

15. The display device substrate as defined in claim 1 or 2, which satisfies the relation represented by the mathematical expression (2) below;

$$\{r \times \Delta T \times (Er \times hr)\}/\{Eg \times hg\} \geq 1.9 \times 10^{-4} \qquad (2).$$

16. The display device substrate as defined in claim 15, wherein said glass sheets have a total thickness no smaller than 60 µm.

17. The display device substrate as defined in claim 15, wherein said glass sheets have a total thickness no smaller than 100 µm.

18. The display device substrate as defined in claim 15, wherein said glass sheets have a total thickness no smaller than 140 µm.

19. The display device substrate as defined in claim 1 or 2, which satisfies the relation represented by the mathematical expression (3) below;

$$\{\alpha r \times \Delta T \times (Er \times hr)\} \geq 2800 \text{ Pa·m (Pascal-meter)} \qquad (3).$$

20. The display device substrate as defined in claim 1 or 2, which satisfies the relation represented by the mathematical expression (4) below;

$$(\alpha r \times \Delta T \times hr) \geq 1.4 \times 10^{-6} \text{ m} \qquad (4).$$

21. The display device substrate as defined in claim 1 or 2, wherein said glass sheets have a total thickness no larger than 150 µm and the display device substrate satisfies the relation represented by the mathematical expression (5) below;

$$\{\alpha r \times \Delta T \times (Er \times hr)\} \geq 2100 \text{ Pa·m} \qquad (5).$$

22. The display device substrate as defined in claim 1 or 2, wherein said glass sheets have a total thickness no larger than 100 µm and the display device substrate satisfies the relation represented by the mathematical expression (6) below;

$$\{\alpha r \times \Delta T \times (Er \times hr)\} \geq 1400 \text{ Pa·m} \quad (6).$$

23. The display device substrate as defined in claim 14, wherein the maximum temperature to be reached by the plastics material during its curing or molding is lower than its glass transition point (Tg) and ΔT is a difference between the operating temperature of the display device substrate and the maximum temperature to be reached by the plastics material during its curing or molding.

24. The display device substrate as defined in claim 1, wherein said glass sheets have an internal compressive strain no smaller than $3.4 \times 10^{-4}$.

25. The display device substrate as defined in claim 24, which has a thickness no larger than 0.3 mm.

26. The display device substrate as defined in claim 24 or 25, which satisfies the relation represented by the mathematical expression (7) below;

$$|\{(\alpha g - \alpha r) \times \Delta T \times (Er \times hr)\}/\{(Er \times hr) + (Eg \times hg)\}| \geq 3.4 \times 10^{-4} \quad (7)$$

(where ΔT denotes a difference between the operating temperature of the display device substrate and the glass transition point (Tg) of the plastics material or the maximum temperature to be reached by the plastics material during its curing or molding if the latter is lower than the former.)

αg=coefficient of linear expansion of glass used
αr=coefficient of linear expansion of plastics material
Eg=elastic modulus of glass
Er=elastic modulus of plastics material
hg=total thickness of glass sheets
hr=thickness of plastics material.

27. The display device substrate as defined in claim 24 or 25, which satisfies the relation represented by the mathematical expression (8) below;

$$\{\alpha r \times \Delta T \times (Er \times hr)\}/\{Eg \times hg\} \geq 3.4 \times 10^{-4} \quad (8).$$

28. The display device substrate as defined in claim 27, wherein said glass sheets have a total thickness no smaller than 100 μm.

29. The display device substrate as defined in claim 27, wherein said glass sheets have a total thickness no smaller than 140 μm.

30. The display device substrate as defined in claim 24 or 25, wherein said glass sheets have a total thickness no larger than 140 μm and the display device substrate satisfies the relation represented by the mathematical expression (9) below;

$$\{\alpha r \times \Delta T \times (Er \times hr)\} \geq 3500 \text{ Pa·m} \quad (9).$$

31. The display device substrate as defined in claim 24 or 25, wherein said glass sheets have a total thickness no larger than 140 μm and the display device substrate satisfies the relation represented by the mathematical expression (10) below);

$$(\alpha r \times \Delta T \times hr) \geq 1.7 \times 10^{-6} \text{ m} \quad (10).$$

32. The display device substrate as defined in claim 24 or 25, wherein said glass sheets have a total thickness no larger than 100 μm and the display device substrate satisfies the relation represented by the mathematical expression (11) below;

$$\{\alpha r \times \Delta T \times (Er \times hr)\} \geq 2500 \text{ Pa·m} \quad (11).$$

33. The display device substrate as defined in claim 24 or 25, wherein said glass sheets have a total thickness no larger than 100 μm and the display device substrate satisfies the relation represented by the mathematical expression (12) below.

$$(\alpha r \times \Delta T \times hr) \geq 1.2 \times 10^{-6} \text{ m} \quad (12).$$

34. The display device substrate as defined in claim 26, wherein the maximum temperature to be reached by the plastics material during its curing or molding is lower than its glass transition point (Tg) and ΔT is a difference between the operating temperature of the display device substrate and the maximum temperature to be reached by the plastics material during its curing or molding.

35. The display device substrate as defined in claim 1, which has a thickness no larger than 0.2 mm and wherein said glass sheets have an internal compressive strain no smaller than $3.4 \times 10^{-4}$.

36. The display device substrate as defined in claim 35, which satisfies the relation represented by the mathematical expression (13) below);

$$|\{(\alpha g - \alpha r) \times \Delta T \times (Er \times hr)\}/\{(Er \times hr) + (Eg \times hg)\}| \geq 3.4 \times 10^{-4} \quad (13)$$

(where ΔT denotes a difference between the operating temperature of the display device substrate and the glass transition point (Tg) of the plastics material or the maximum temperature to be reached by the plastics material during its curing or molding if the latter is lower than the former.)

αg=coefficient of linear expansion of glass used
αr=coefficient of linear expansion of plastics material
Eg=elastic modulus of glass
Er=elastic modulus of plastics material
hg=total thickness of glass sheets
hr=thickness of plastics material.

37. The display device substrate as defined in claim 35, which satisfies the relation represented by the mathematical expression (14) below;

$$\{\alpha r \times \Delta T \times (Er \times hr)\}/\{Eg \times hg\} \geq 3.4 \times 10^{-4} \quad (14).$$

38. The display device substrate as defined in claim 37, wherein said glass sheets have a total thickness no smaller than 100 μm.

39. The display device substrate as defined in claim 35, wherein said glass sheets have a total thickness no larger than 100 μm and the display device substrate satisfies the relation represented by the mathematical expression (15) below);

$$\{\alpha r \times \Delta T \times (Er \times hr)\} \geq 2500 \text{ Pa·m} \quad (15).$$

40. The display device substrate as defined in claim 35, wherein said glass sheets have a total thickness no larger than 100 μm and the display device substrate satisfies the relation represented by the mathematical expression (16) below;

$$(\alpha r \times \Delta T \times hr) \geq 1.2 \times 10^{-6} \text{ m} \quad (16).$$

41. The display device substrate as defined in any one of claims 35 to 40, wherein the maximum temperature to be reached by the plastics material during its curing or molding is lower than its glass transition point (Tg) and ΔT is a difference between the operating temperature of the display device substrate and the maximum temperature to be reached by the plastics material during its curing or molding.

42. The display device substrate as defined in claim 1, wherein said glass sheets have an internal compressive strain no smaller than $5.0 \times 10^{-4}$.

43. The display device substrate as defined in claim 42, which has a thickness no larger than 0.3 mm.

44. The display device substrate as defined in claim 42 or 43, which satisfies the relation represented by the mathematical expression (17) below;

$$|\{(\alpha g - \alpha r) \times \Delta T \times (Er \times hr)\} / \{(Er \times hr) + (Eg \times hg)\}| \geq 5.0 \times 10^{-4} \quad (17)$$

(where $\Delta T$ denotes a difference between the operating temperature of the display device substrate and the glass transition point (Tg) of the plastics material or the maximum temperature to be reached by the plastics material during its curing or molding if the latter is lower than the former.)

$\alpha g$=coefficient of linear expansion of glass used
$\alpha r$=coefficient of linear expansion of plastics material
Eg=elastic modulus of glass
Er=elastic modulus of plastics material
hg=total thickness of glass sheets
hr=thickness of plastics material.

45. The display device substrate as defined in claim 44, wherein said glass sheets have a total thickness no smaller than 100 μm.

46. The display device substrate as defined in claim 44, wherein said glass sheets have a total thickness no smaller than 140 μm.

47. A display device which is formed with at least one piece of the display device substrate defined in claim 1 or 2.

* * * * *